March 10, 1959     R. GOUIRAND     2,877,010
PNEUMATIC SUSPENSION FOR MOTOR VEHICLES
Filed Oct. 16, 1956     2 Sheets-Sheet 1
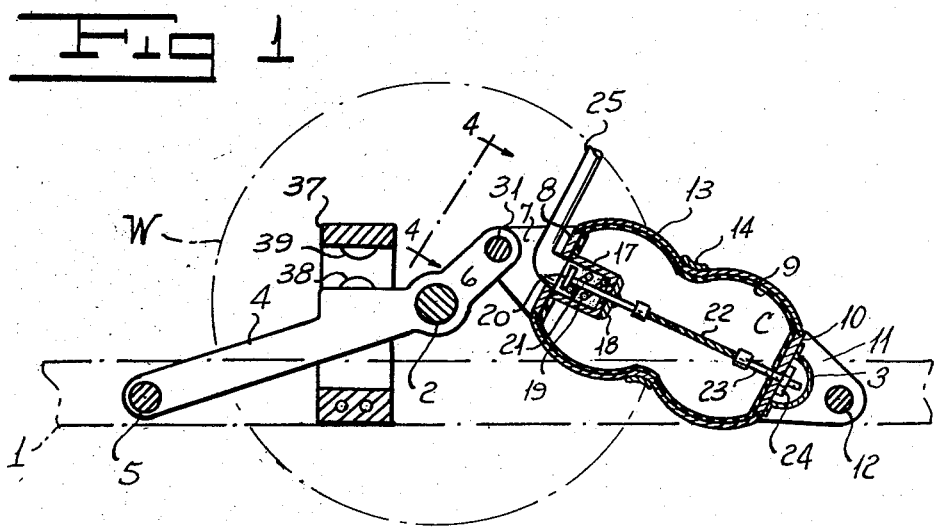
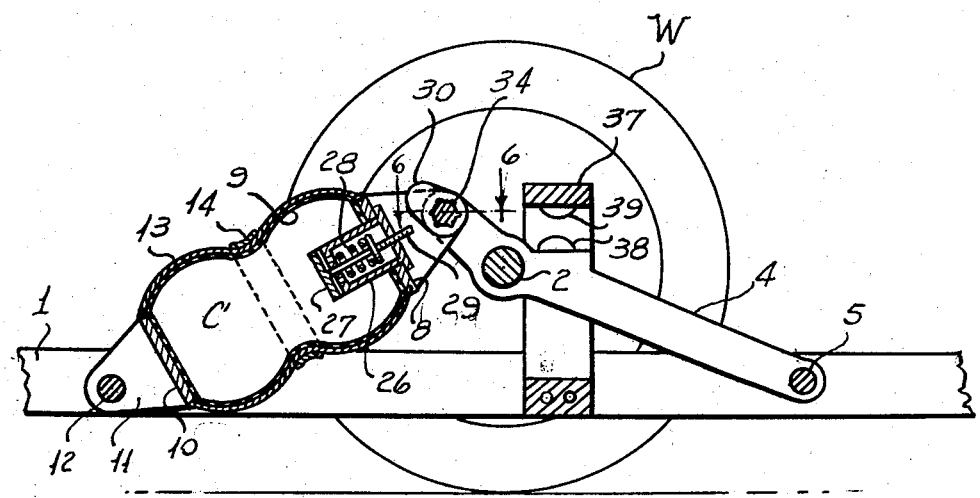
INVENTOR
RENE GOUIRAND
BY
ATTORNEY

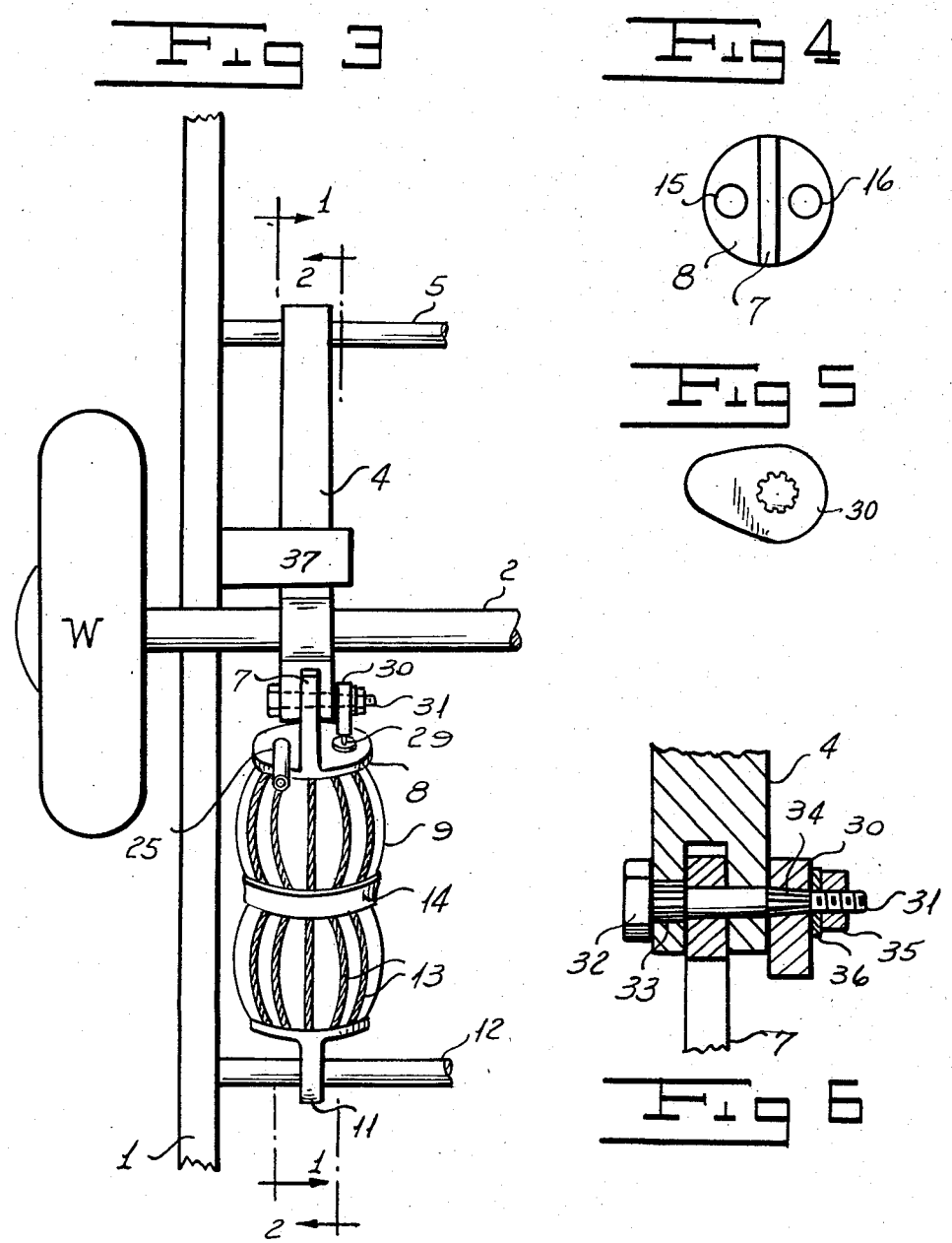

United States Patent Office 2,877,010
Patented Mar. 10, 1959

2,877,010

PNEUMATIC SUSPENSION FOR MOTOR VEHICLES

Rene Gouirand, New York, N. Y.

Application October 16, 1956, Serial No. 616,331

9 Claims. (Cl. 267—15)

This invention is a pneumatic suspension for motor vehicles and while it may be employed on vehicles of various kinds, it is primarily intended for use on automobile pleasure cars or light delivery trucks. It contemplates independent wheel suspension in that a separate suspension is associated with each of the wheels of the vehicle.

The invention differs from pneumatic suspensions, as heretofore employed, in that in prior constructions the pneumatic member served to support the weight by imposing the same upon the pneumatic member in such manner as to effect compression thereof in a direction longitudinally of its axis.

According to this invention, the weight is sustained or carried by a plurality of non-stretchable members extending longitudinally of a pneumatic chamber which is cross axially expandable under the influence of compressed air contained therein to cause a cross axial bulging of the chamber to a greater or lesser extent with a concurrent increase or decrease in the length of the chamber.

In its preferred practical form an elongated compression chamber and a lever are arranged in upwardly converging relation with their upper ends pivoted to one another and their lower ends pivoted in spaced relation, to the corresponding side of the chassis frame to be supported. The axle is secured to the lever intermediate the ends of the latter, so that said lever is in effect a lever of the second class. The compressed air in the pneumatic chamber is so controlled that it will properly support the weight and load under all conditions and at the same time provide a resilient support for the corresponding portion of the chassis frame.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is a vertical section on the line 1—1 of Fig. 3.

Fig. 2 is a like section on the line 2—2 of Fig. 3.

Fig. 3 is a plan view of one of the suspensions associated with one rear wheel at one side of a vehicle, it being understood that the suspension at the opposite side of the vehicle is of like character.

Fig. 4 is a face view of one of the end plates or brackets of the pneumatic element.

Fig. 5 is a side elevation of a cam which I employ, detached from the remainder of the structure.

Fig. 6 is a section on the line 6—6 of Fig. 2.

In the drawings 1 designates a chassis frame of a motor vehicle and 2 the axle which extends across said frame and supports a wheel W at each end. A lever 4 is fulcrumed at one end on a rod 5 which extends transversely of the frame 1 and said lever is secured intermediate its ends to the axle 2 in any appropriate manner. The other end of said lever is bifurcated and is pivoted to a central fin 7 of a terminal bracket provided with a circular base 8, shown best in Fig. 4. This circular base is firmly secured to an elastic tubular pneumatic member 9, the other end of which is secured to the circular base 10 of a second terminal bracket which has a central fin 11 secured to a rod 12 which extends transversely of the frame. Both ends of the tubular pneumatic element are sealed so as to provide a pneumatic chamber C.

The lateral walls of the pneumatic chamber are of elastic materal, such as natural or synthetic rubber and they are adapted to cross axially expand and contract according to the pressure of the air within the enclosed chamber. However, there is either incorporated in the structure of the walls or exteriorly thereof a plurality of non-stretchable cable members which are secured to the plates 8 and 10 of the terminal brackets. As the pressure within the pneumatic chamber is increased or decreased, the lateral wall of this chamber is bulged to a greater or lesser extent and by so doing bows the cables to a greater or lesser extent in an outward direction with consequent concurrent variation in the longitudinal spacing apart of the terminal members. In other words, the more the side walls of the chamber are bulged outwardly, the closer the terminal members will be drawn together, while a lesser bulging of the lateral wall of the chamber will result in less bowing of the cables with a consequent increase in the spacing between the terminal members.

I preferably provide a chamber at a point intermediate its length with an encircling band or ring which may be elastic or otherwise and thus confine the chamber midway of its length so that the bulging to which reference has been made occurs in both opposite end portions of the chamber walls rather than throughout the entire length of the chamber.

As shown in the drawings, the lever and the pneumatic chamber are arranged in upwardly inclined relation toward one another, so that an increase in loading of the chassis frame will cause a lowering thereof with consequent elongation of the pneumatic chamber while a lessening of the load will operate in a contrary manner.

Assuming that there is a predetermined pressure within the chamber C for a particular loading and the load on the chassis is increased. As a result, the chassis frame will be depressed while the axle will remain at the same distance from the ground. Consequently the lever 4 is rotated anti-clockwise (in Fig. 1) while the resulting pneumatic element will rotate clockwise (in said figure) with concurrent elongation of the pneumatic element. In order to re-establish the conditions shown in Fig. 1, a greater pressure of air will be required within the chamber C. On the other hand, if the load on the chassis frame is decreased, the chassis frame will elevate causing a longitudinal contraction of the pneumatic element to a point where it will be shorter within the optimum normal condition shown in Fig. 1, whereupon the pressure in the chamber C should be decreased.

The increase or decrease of the pressure in the chamber is according to the present invention accomplished in the following manner:

The circular base 8 of the terminal bracket, as shown in Fig. 4, is provided at opposite sides of the fin 7 with two openings 15 and 16. Juxtaposed with the opening 15 and secured to the inner side of the plate 8 is a valve cage 17 shown in Fig. 1. The inner end of this cage is closed save for a plurality of perforations. A valve 18 is adapted to be normally seated against the end of said cage to seal said openings, by means of a coil spring 19 acting against a head 20 mounted on the upper end of a valve stem 21 to which the valve 18 is affixed. This valve stem is secured by a cable 22 to an adjusting spindle 23 which passes through the plate of the lower terminal bracket 10 and is threaded to receive an adjusting nut 24 by means of which the relation of the valve 18 to its seat may be regulated. A removable cover 3 covers the nut 24.

The adjustment of the nut is such that, when the parts are in the normal optimum condition, as shown in Fig. 1, the valve will be seated and the pressure in the chamber C will be at optimum value. However, if the pneumatic element becomes unduly elongated, due to, for example, overloading of the vehicle, the cable 22 will withdraw the valve 18 from its seat and permit the feed of further air under pressure through an intake pipe 25 connected to any suitable source of air under pressure, such as a compressed air tank on the vehicle. The feed of compressed air and consequent regulation of the pressure in the pneumatic element, according to the loading, is thus automatically accomplished.

In order to control the lowering of the pressure in the chamber C, a valve arrangement, such as shown in Fig. 2, is employed. It comprises a valve cage 26 fitted into the opening 16 of the terminal plate of Fig. 4. The inner end of this valve cage is closed except for a plurality of perforations in its end wall and these perforations are normally sealed by a valve 27 which is normally held to its seat by a coiled spring 28. The valve stem 29 projects into the path of a cam 30 which is normally rigid with the lever 4 and is so adjusted with respect thereto that, when the chassis frame 1 elevates to an undesirable degree, said cam will engage with the outer end of the valve stem 29 and unseat the valve 27 to permit the pressure in the chamber C to be relieved until the relation of the parts to normal is re-established. When this occurs, the cam 30 disengages the valve stem and the spring 28 reseats the valve.

The pivotal connection of the lever 4 to the adjacent terminal plate 8 is made through a bolt 31 of the character shown best in Fig. 6. This bolt extends through the bifurcated part of the lever arm 6, through the fin 7 of the terminal plug and through the cam 30. Adjacent the head 32, the bolt has a portion 33 which extends through one arm of the bifurcation, is circumferentially toothed and fits into a correspondingly shaped hole in one side of the bifurcation of the lever, so as to lock the bolt against rotation relative to the lever 4. The part of the pin which extends through the terminal fin 7 and also through the other side of the bifurcation is circular, so as to permit free pivotal movement between the lever 4 and the terminal fin 7. That part 34 of the pin which extends through the cam 30 is tapered and is circumferentially toothed and fitted into a like hole in said cam. Beyond the cam 30 the pin is threaded to receive a nut 35 acting against a washer 36.

It is possible with this arrangement to change the adjustment between the cam 30 and the valve stem 29 by removing the nut 35 and washer 36, withdrawing the cam 30 from the tapered portion 34 of the bolt and replacing it in a different angular position to produce the adjustment desired. The replacement of the washer and nut 35 will lock the cam in the newly adjusted position.

With the arrangement described, the chassis frame and the load thereon, whether it be animate or inanimate, is properly cushioned against a shock due to the passage of the wheel over uneven surfaces, because of the inherent resiliency of the pneumatic element and different loadings on the chassis frame are automatically compensated for, so as to produce an optimum relation between the chassis frame and the axle.

In order to guide the lever 4 during its operations and to preclude undesirable lateral movement thereof with respect to the chassis frame, an inverted U-shaped guide 37 is preferably secured to the chassis frame and straddles the lever. The lever may be provided with a bumper 38 adapted to coact with a cooperating bumper 39 on the guide 37 to limit travel of the lever in an upward direction.

The suspension which I have described is relatively simple in construction, quite sensitive to changes in loading and to unevenness in road surface and is thus able to perform its functions in an effective manner to impart to the vehicle smooth riding qualities under all conditions.

The foregoing detailed description sets forth the invention in its preferred practical form, but the invention is to be understood as fully commensurate with the appended claims.

Having thus fully described the invention, what I claim as new and desire to secure by Letters Patent is:

1. An independent wheel suspension for vehicles comprising: a chassis frame, a lever and a generally circular elongated pressure chamber containing air under pressure, both arranged in upwardly inclined relation toward one another at one side of the chassis frame with their upper ends pivoted to one another and their lower ends pivoted to the chassis frame in spaced relation longitudinally of the latter, and an axle secured to the latter intermediate the ends of the latter, said pneumatic chamber having an elastic longitudinal wall expandable and contractable in a cross axial direction to respectively decrease and increase the axial length of said chamber, whereby the weight of that portion of the chassis frame and its load is elastically counterbalanced and sustained from the axle by the longitudinal tension on the pneumatic chamber resulting from cross axial expansion of its walls by the compressed air contained therein, means for controlling the air pressure in the pneumatic chamber, and non-stretchable members extending longitudinally for the full length of said chamber and spaced apart circumferentially of said chamber.

2. An independent wheel suspension for vehicles according to claim 1, wherein the non-stretchable members are cables.

3. An independent wheel suspension for vehicles according to claim 1, wherein the opposite ends of the pneumatic chamber are attached to rigid terminal plates, and load carrying cables extending longitudinally of the pneumatic chamber and anchored to the terminal plates at their opposite ends.

4. An independent wheel suspension for vehicles according to claim 1, wherein the means for controlling the air pressure in the pneumatic chamber comprises a valve for admitting compressed air into said chamber, and a relief valve for relieving the air pressure in said chamber.

5. An independent wheel suspension for vehicles according to claim 4, wherein the valve for admitting compressed air into the chamber is operable to automatically open to admit such air when the elongation of the pneumatic chamber exceeds the predetermined maximum.

6. An independent wheel suspension for vehicles according to claim 4, wherein the valve for admitting compressed air into the chamber is positioned at one end of the pneumatic chamber and is connected to the opposite end thereof whereby it is adapted to be pulled open when the elongation of the pneumatic chamber exceeds a predetermined maximum.

7. An independent wheel suspension for vehicles according to claim 4, wherein the relief valve has a stem projecting externally of the chamber into the path of a cam carried by the lever to be engaged thereby when the cross sectional expansion of the chamber exceeds a predetermined maximum.

8. An independent wheel suspension for vehicles according to claim 7, wherein the cam is adjustable relative to the lever to adjust the relation between the cam and the valve stem to permit an earlier or later opening of said valve as desired.

9. An independent wheel suspension for vehicles according to claim 8, wherein the cam is mounted on the lever by a bolt having toothed connection with both the lever and the cam, said cam being removable from the bolt to permit change of adjustment thereof relative to the lever.

References Cited in the file of this patent

UNITED STATES PATENTS

| | | |
|---|---|---|
| 2,017,419 | Mercier | Oct. 15, 1935 |
| 2,056,106 | Kuhn | Sept. 29, 1936 |
| 2,361,575 | Thompson | Oct. 31, 1944 |
| 2,776,830 | Gouirand | Jan. 8, 1957 |